Theodore M. Strack
INVENTOR.

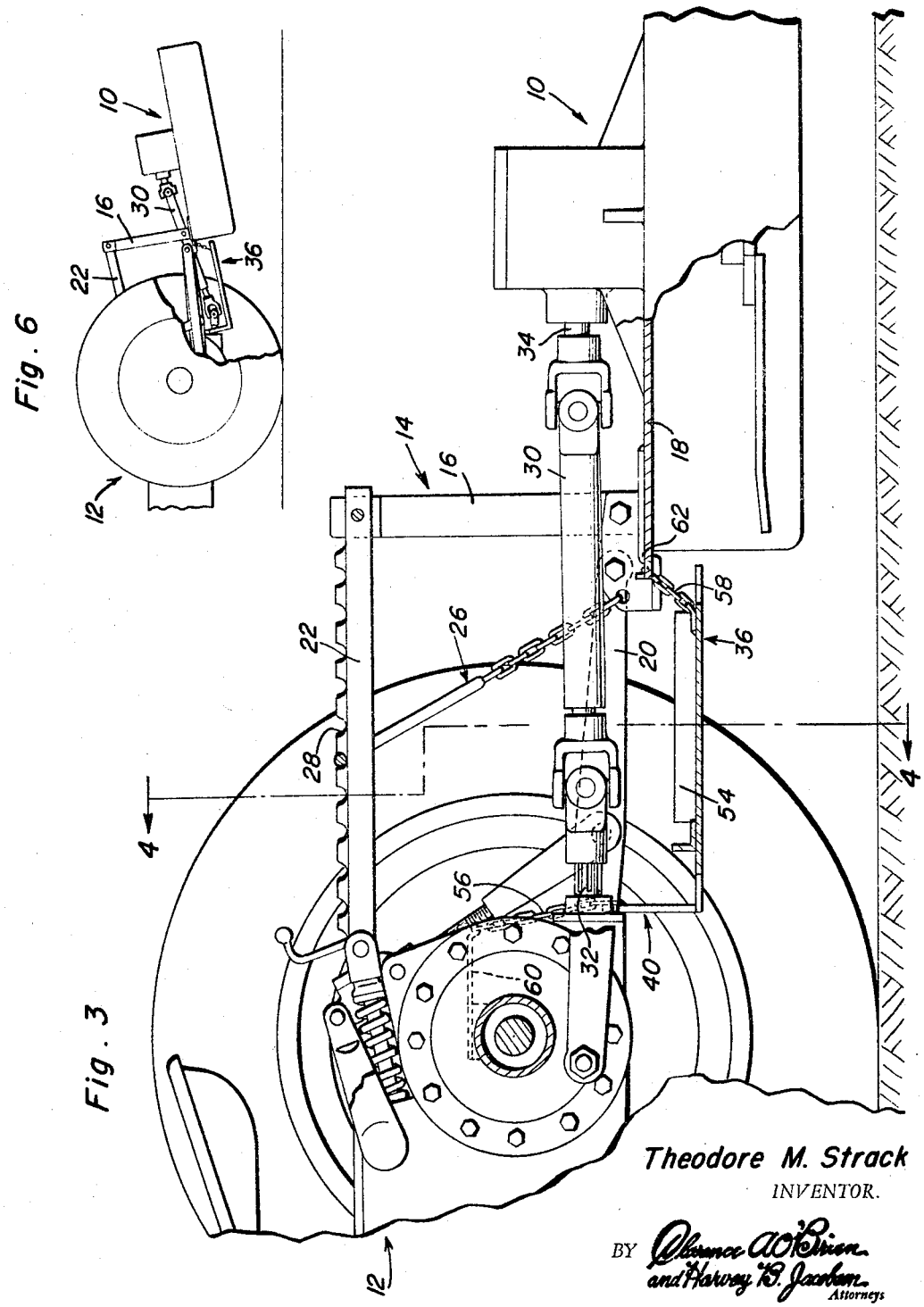

Aug. 2, 1966 T. M. STRACK 3,263,766
PLATFORM-SHIELD FOR TRACTOR EQUIPPED WITH A POWER
TAKE-OFF AND PIVOTED HITCH LINKAGE
Filed Oct. 21, 1964
3 Sheets-Sheet 3
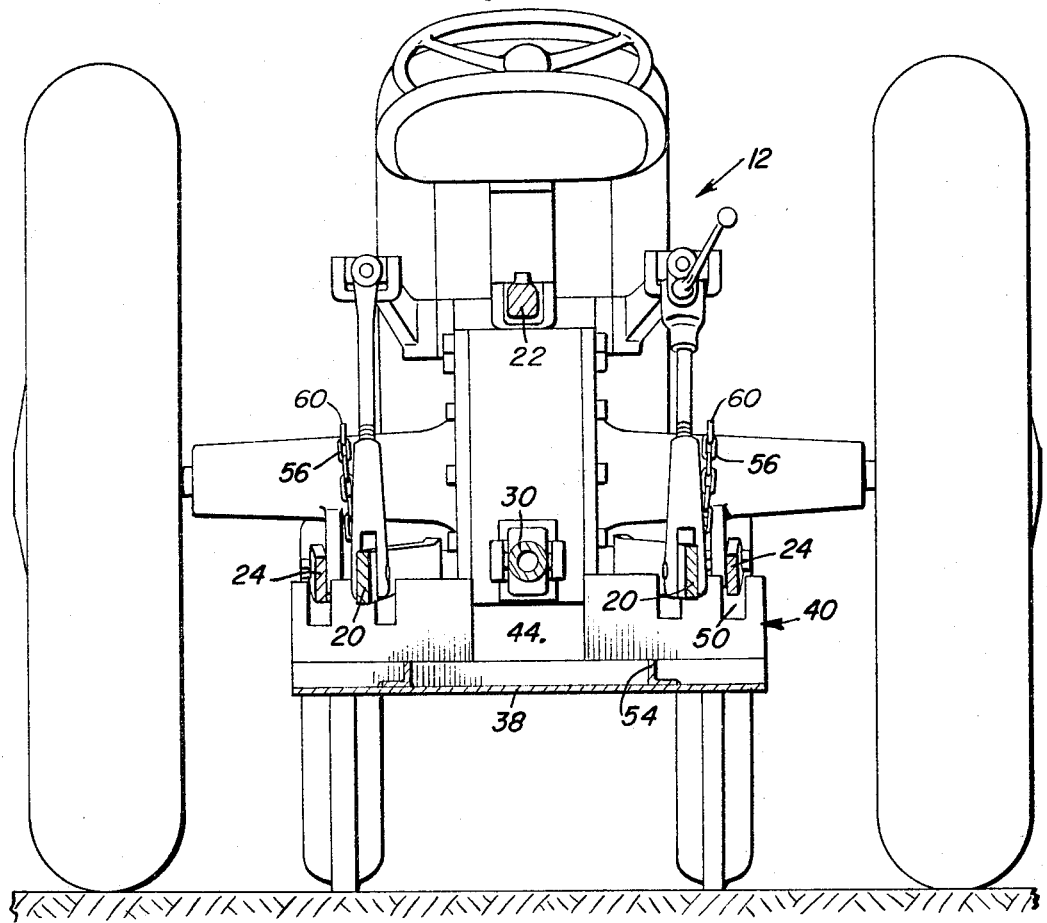
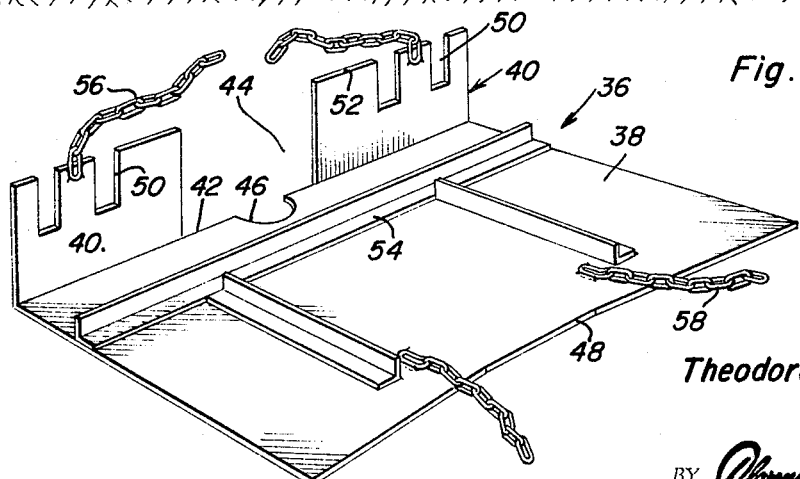
Theodore M. Strack
INVENTOR.

United States Patent Office 3,263,766
Patented August 2, 1966

3,263,766
PLATFORM-SHIELD FOR TRACTOR EQUIPPED WITH A POWER TAKE-OFF AND PIVOTED HITCH LINKAGE
Theodore M. Strack, 4323 Cedar Bayou and Lynchburg Road W., Baytown, Tex.
Filed Oct. 21, 1964, Ser. No. 405,482
4 Claims. (Cl. 180—53)

The instant invention is generally related to tractor drawn bush cutters, and is more particularly concerned with the provision of a shield for such cutters. Accordingly, it is a primary object of the instant invention to provide a shield, mountable between the cutter and the drawing tractor, which effectively acts so as to protect the operator of the device from any dirt or debris which might be thrown by the rotary cutter.

In conjunction with the above object, it is also contemplated that the shield of the instant invention cover substantially the entire area between the rear of the tractor frame and the front of the cutting implement so as to provide a platform which may be safely stood on while the cutter is in operation.

Further, it is an object of the instant invention to provide a shield which is to be releasably mounted and which, when mounted, will maintain its relative position to the cutter throughout the range of vertical adjustment of the cutter.

In addition, it is a significant object of the instant invention to provide a shield which is specifically formed so as to accommodate the various drawing and lifting members of the tractor without interfering with the normal operation of these members, while at the same time utilizing selected ones of the members so as to prevent lateral movement of the shield.

Likewise, it is an object of the instant invention to provide a shield which, while of a relatively simple construction, is of a highly rigid nature capable of performing its various functions in a highly effective manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged side sectional view illustrating further details of the shield and the manner in which it is mounted;

FIGURE 4 is a transverse sectional view through the shield in its mounted position;

FIGURE 5 is a perspective view of the shield itself; and

FIGURE 6 is a side elevational view, on a reduced scale, similar to FIGURE 1, however illustrating the cutter and the shield in their raised position.

Figure 1:
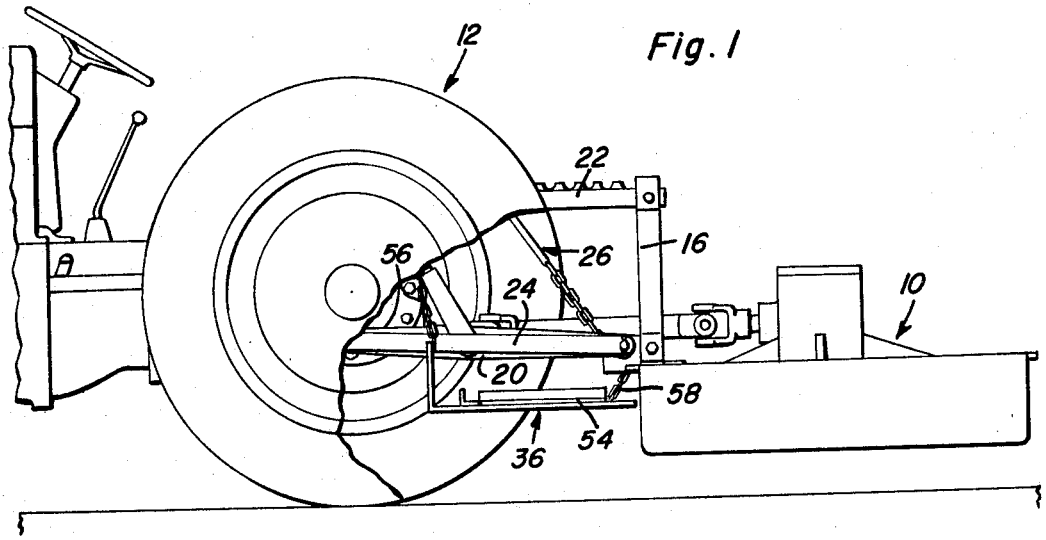
FIGURE 1 is a side elevational view, with portions broken away for purposes of illustration, of the shield of the instant invention mounted in position between a bush cutter and a tractor.
Figure 2:
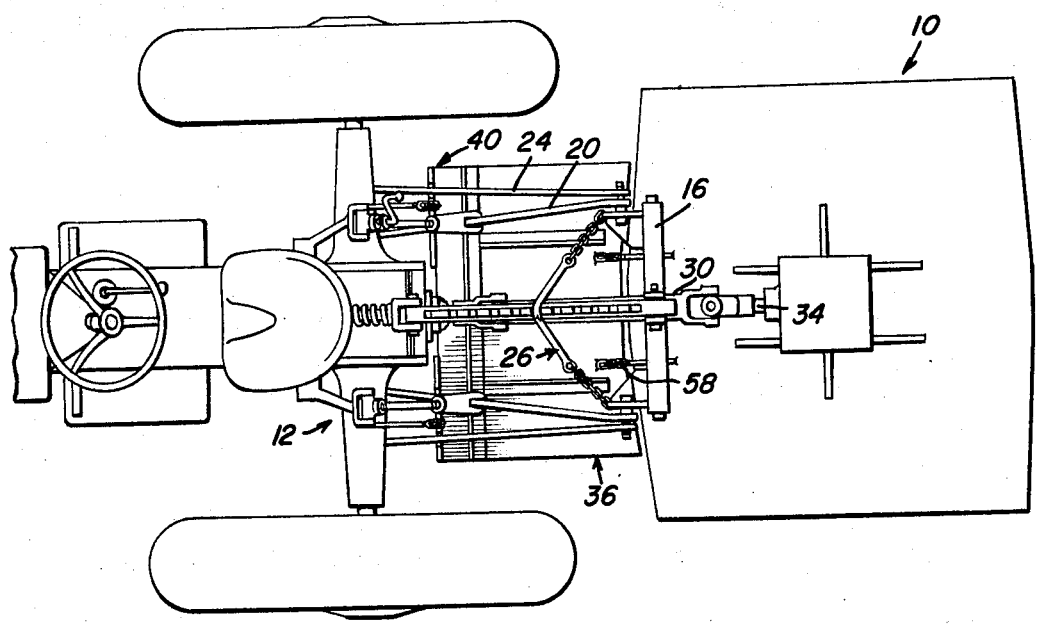
FIGURE 2 is a top plan view of FIGURE 1.

Referring now more specifically to the drawings, it will be noted that FIGURES 1–4 and 6 illustrate a substantially conventional bush cutter 10 mounted on a farm tractor 12 through a three-point hitch 14. This hitch 14 includes an A-frame 16 mounted on and projecting perpendicularly upward from the top plate 18 of the cutter 10, a pair of hydraulically controlled lift arms 20 and an upper stabilizing brace 22. The particular tractor illustrated in the drawings additionally inclues a pair of stabilizing arms 24 generally paralleling the lift arms 20 and pivotally mounted at the opposite ends thereof in the same manner as the lift arms 20, and a limit member 26 selectively received within any one of a plurality of notches 28 along the upper brace 22 with the opposite chain link ends thereof fixed to the cutter 10. The cutter 10 is of course driven through a universal drive shaft 30 engaged between the power take-off 32 on the tractor and the gear drive shaft 34 on the cutter 10.

The above described tractor mounted and controlled cutter sets forth generally conventional construction with it being the primary purpose of the instant invention to provide a shield usable either in the specifically illustrated cutter and tractor combination or in generally similar combinations wherein a trailing implement is mounted on a tractor in spaced relation to the rear of the tractor frame. The shield itself, generally designated by reference numeral 36, includes an enlarged flat generally rectangular steel body 38 having a pair of coplanar steel flanges 40 projecting perpendicularly from the forward edge 42 thereof. These flanges 40 have the inner edges thereof spaced from each other so as to form, in effect, an enlarged notch or space 44 therebetween. The forward edge 42 itself is provided with a semi-circular cutout portion or notch 46 midway between the inner ends of the flanges 40 while the rear edge 48 of the body 38 is generally slightly concave. Each of the flanges 40 includes a pair of slots 50 extending vertically inward from the upper edge 52 thereof. The body 38, inasmuch as it is also to be used as a standing platform, is rigidified by elongated angle reinforcing bars 54 extending across the upper surface thereof at right angles to each other with each bar 54 having one leg thereof welded directly to the body 38. Incidentally, these bars 54 are welded to the upper surface of the body 38 so as to avoid any projections on the lower surface of the body 38 such as might tend to snag on the bush and prevent a proper introduction of the bush into the cutter 10. Finally, the shield 36 includes a pair of forward hangers in the form of elongated link chains 56, each having one end thereof welded to one of the flanges 40, and a pair of elongated rear hangers in the form of link chains 58 welded to the upper surface of the body 38 adjacent the rear edge 48.

With reference to FIGURES 1–4, it will be noted that the shield 36 is suspended, through the flexible hangers 56 and 58, directly beneath the drive shaft 30. The front hangers or chains 56 are releasably engaged with rearwardly projecting hooks 60 welded to the frame with these hooks 60 being selectively engageable within any of the links of the chains 56 so as to vary the vertical elevation of the shield 36. By the same token, the rear chains 58 are selectively engaged with a pair of hooks 62 welded to the top plate of the cutter 10 with the desired elevation of the shield 36 determining which of the links of the chains 58 are to be releasably engaged by the hooks 62. The shield 36 is to be centrally located with the drive shaft, and more particularly the power take-off 32 of the tractor, orientated within the space or notch 44 and the lateral enlargement thereof formed by the body notch 46.

The flange notches 50 accomodate both the lift arms 20 and the stabilizing arms 24 therethrough so as to effectively close off the forward edge of the shield and provide a guard to keep debris from passing over the shield 36. These notches provide an additional significant function in that, inasmuch as the arms 20 and 24 are received therein, excessive lateral movement of the shield 36 will be prevented by engagement of the arms with the sides of the notches 50. Incidentally, in those instances where no stabilizing arms 24 are provided, it will be appreciated that only one notch 50, for the lift arms 20, will be needed in each flange 40. By the same token, if desired, the notches can be laterally enlarged so as to accomodate various differences in the lift arm arrangement of different types of tractors. Mounted in this manner, it will be appreciated that the shield 36 covers substantially the entire area between the rear of the tractor frame and the front of the cutter 10 so as to protect the operator from any possibility of debris being thrown up between the cutter and tractor, while at the same time providing, due to its rigid construction, a safe platform upon which the operator might stand. Furthermore, using elongated flexible hangers such as the link chains 56 and 58 is deemed particularly significant in that this allows the shield 36 to be raised and lowered in conjunction with the raising and lowering of the implement or cutter 10.

The foregoing is considered as illustrative only of the principles of the invention. Further, since numerous modifications and changes will readily occur to those skilled in the art, it is not desired to limit the invention to the exact construction and operation shown nd described, and accordingly all suitable modifications and equivalents may be resorted to, falling within the scope of the invention as claimed.

What is claimed as new is as follows:

1. For use in combination with a tractor and a spaced hitch mounted trailing implement driven by a drive shaft from the power take-off thereof, a shield, said shield being orientatable between the rear of the tractor frame and the front of the implement below the drive shaft, said shield comprising a generally flat enlarged body, a vertical guard fixed along one edge of the body, said guard being positionable immediately to the rear of the tractor frame, and elongated hanger means fixed to the shield adjacent said one edge and the opposite edge, said hanger means being releasably engageable with the tractor frame and the trailing implement, said guard including a plurality of slots extending vertically inward from the upper edge thereof for the accommodation of various ones of the tractor hitch elements, said slots, through engagement with the hitch elements, limiting lateral movement of the shield.

2. The shield of claim 1 wherein said vertical guard includes two coplanar portions longitudinally spaced from each other along said one edge so as to accommodate the tractor power take-off therebetween.

3. The shield of claim 2 including a plurality of reinforcing members rigidly affixed along the upper face of the shield body.

4. The shield of claim 3 wherein said hanger means consists of flexible fixed length members.

References Cited by the Examiner
UNITED STATES PATENTS
2,588,953   3/1952   Bausch et al.
2,891,369   6/1959   Rietz _____ 56—25.4

A. HARRY LEVY, *Primary Examiner.*